(12) United States Patent
Sceats et al.

(10) Patent No.: US 11,701,630 B2
(45) Date of Patent: Jul. 18, 2023

(54) REACTOR SYSTEM FOR PRODUCING A NANO-ACTIVE POWDER MATERIAL

(71) Applicant: CALIX LTD, New South Wales (AU)

(72) Inventors: Mark Sceats, New South Wales (AU); Philip Hodgson, New South Wales (AU); Adam Vincent, New South Wales (AU); Simon Thomsen, New South Wales (AU); Matthew Gill, New South Wales (AU); Daniel Rennie, New South Wales (AU)

(73) Assignee: CALIX LTD, New South Wales (AU)

( * ) Notice: Subject to any disclaimer, the term of this patent is extended or adjusted under 35 U.S.C. 154(b) by 0 days.

(21) Appl. No.: 17/886,756

(22) Filed: Aug. 12, 2022

(65) Prior Publication Data

US 2022/0387951 A1    Dec. 8, 2022

Related U.S. Application Data

(63) Continuation of application No. 16/345,474, filed as application No. PCT/AU2017/051190 on Oct. 27, 2017, now Pat. No. 11,446,621.

(30) Foreign Application Priority Data

Oct. 31, 2016 (AU) .............................. 2016904444

(51) Int. Cl.
*B01J 6/00* (2006.01)
*B82Y 30/00* (2011.01)
(Continued)

(52) U.S. Cl.
CPC ............... *B01J 6/004* (2013.01); *B82Y 30/00* (2013.01); *B82Y 40/00* (2013.01); *C01B 13/18* (2013.01);
(Continued)

(58) Field of Classification Search
CPC . B01J 6/004; B01J 2219/00051; B82Y 30/00; B82Y 40/00; C01B 13/185;
(Continued)

(56) References Cited

U.S. PATENT DOCUMENTS 8,603,222 B2* 12/2013 Sceats .................... B01D 53/62
                                                                95/110
2014/0348727 A1* 11/2014 Horley ................... F27D 17/004
                                                                423/1

* cited by examiner

*Primary Examiner* — Steven J Bos
(74) *Attorney, Agent, or Firm* — Elmore Patent Law Group, P.C.; Joseph C. Zucchero

(57) ABSTRACT

A method and system for producing nano-active powder materials. The method can be used with a reactor system comprising stages in which input particles flow under gravity progressively through stages of the reactor. A powder injector first stage in which ground input precursor powder is injected into the reactor. An externally heated preheater stage may be in the reactor, in which the precursor powder is heated to a temperature of calcination reaction. An externally heated calciner stage in the reactor, in which primary precursor volatile constituents can be rapidly removed calcination reactions as a high purity gas stream to produce the desired nano-active product. A post-processing reactor stage in which there is a change of the gas stream composition to produce the desired hot powder product by virtue of the nano-activity of the first powder material. A powder ejector stage in which the hot powder product is ejected from the reactor.

18 Claims, 4 Drawing Sheets

(51) Int. Cl.
 *B82Y 40/00* (2011.01)
 *C01B 13/18* (2006.01)
 *C04B 2/10* (2006.01)
 *C04B 7/44* (2006.01)
(52) U.S. Cl.
 CPC .............. *C01B 13/185* (2013.01); *C04B 2/10* (2013.01); *C04B 2/102* (2013.01); *C04B 7/44* (2013.01); *B01J 2219/00051* (2013.01); *C01P 2004/61* (2013.01); *C01P 2006/12* (2013.01)
(58) Field of Classification Search
 CPC ....... C04B 7/44; C04B 2/102; C01P 2004/61; C01P 2006/12
 See application file for complete search history.

REACTOR SYSTEM FOR PRODUCING A NANO-ACTIVE POWDER MATERIAL

RELATED APPLICATIONS

This application is a continuation of U.S. application Ser. No. 16/345,474, filed Apr. 26, 2019, which is a US National stage entry of International Application No. PCT/AU2017/051190, which designated the United States and was filed on Oct. 27, 2017, published in English.

This application claims priority under 35 U.S.C. § 119 or 365 to AU, Application No. 2016904444, filed Oct. 31, 2016. The entire teachings of the above applications are incorporated herein by reference.

TECHNICAL FIELD

The present invention relates broadly to the means of calcination of materials to produce high surface area, nano-active, materials.

BACKGROUND

There have been significant developments in the applications of nano materials for a wide range of applications in medicine, agriculture, aquaculture, water treatment, catalyst and catalyst supports, cements, battery materials, and materials for 3D-printing. However, nanomaterials are intrinsically hard to handle as aerogel powders, costly to produce, and they tend to aggregate into random clusters. Nanomaterial synthesis usually occurs in solutions such as liquids or gels, and usually under ambient conditions.

An alternative approach of preparation of nano-active materials has been described by Sceats (AU2014374829) and Sceats and Hodgson (PCT/AU2015/050764) in which materials are produced from magnesite. However, when applied to other materials, there are a number of problems associated with sintering the product or particles may inadvertently undergo chemical or physical property changes for particular minerals.

With respect to segmentation, Sceats PCT/AU2015/000684 described the benefits of using a two-stage reactor for processing dolomite where there are two calcination steps. However, when applied to other materials, there are a number of problems associated with sintering the product and generating a desired material with desired properties.

Sintering within a particle is the process where the particles reduce its beneficial high energy nanocrystalline surfaces by the growth of larger grains and pores to replace the small grains and pores. The highest energy surfaces associated with the smallest structures are the first to sinter. This is conceptually a process of pore reaction, where diffusion of material takes place between two small pores to make a larger pore with a lower surface area and lower energy. Thus length scales of the materials also increase, and the material loses its nanoscale properties. Sintering between particles to form larger particles by necking must also be suppressed. Thus any sintering leads to a reduction of the surface area, and the desired nano-scale properties are reduced. Sintering also removes high energy crystalline defects within the particles, such as oxygen defects, and again, desirable attributes may be lost. In sum, the sintering of the particles is not desirable. Examples of such kiln processed materials are clinker formation for cement, and magnesium metal production by the reduction of magnesium oxide by ferrosilicon. Thus there is a need for a means of producing nano-active materials together in a single reactor, so that they enhance the particle-particle reaction rate in subsequent pyro-processing stages.

Other known devices may include rotary kilns or other furnaces, in which particles react more quickly with each other by virtue of the high contact surface area between the particles in the mixture when they are formed into a bed or a moving bed, such as a rotary kiln at higher temperature in a second pyro-process. The final product will generally not have any nano-active properties, or at least uniform or desired nano-active properties, due to the sintering in this type of kiln/reactor.

In addition, the energy required to sinter a powder is substantially higher as the residence time and/or the temperature within a preheater and/or calciner must be larger. Therefore, the overall product volume producible may be limited by these temperatures and/or residence times within the reactor.

The objective of this invention is to provide an improvement over the known calcination production processes to produce materials which may exhibit nano-active properties.

Any discussion of the prior art throughout the specification should in no way be considered as an admission that such prior art is widely known or forms part of common general knowledge in the field.

SUMMARY

Problems to be Solved

It may be advantageous to provide a system and/or method for producing a nano-active material in a more efficient manner.

It may be advantageous to provide a system and/or method for producing a product in which sintering is substantially minimised.

It may be advantageous to provide a system and/or method for producing a material with enhanced nano-active properties.

It may be advantageous to provide a system which may produce a product with a relatively large surface area.

It may be an advantage to provide for a system which can be up-scaled and/or which retains a high level of efficiency relative to other known reactors.

It may be an object of the invention to improve the performance of known reactor systems to produce nano-active materials.

The invention described herein may address at least one of the aforementioned issues of gas composition, temperature profile, energy consumption, and scale-up of the calcination reactors as a means for facilitating the production of nano-active materials, and potentially the range of applications to which the reactor can be applied.

Means for Solving the Problem

In a first aspect of the present disclosure may be directed towards a method for producing nano-active powder materials in a reactor system. The system comprising stages in which input particles flow downwards under gravity progressively through the stages. A powder injector first stage in which ground input precursor powder may be injected into the reactor; and an externally heated preheater stage in which the precursor powder may be heated to a temperature of calcination reaction. The externally heated calciner reactor stage may allow for primary precursor volatile constituents to be rapidly removed by the calcination reaction as a high purity gas stream to produce the desired nano-active product. A post-processing reactor stage in which there may be a change of the gas stream composition to produce the desired hot powder product by virtue of the nano-activity of the first powder material; and a powder ejector stage in which the hot powder product may be ejected from the reactor.

Preferably, a heat exchanger is used to transfer heat from the hot solids from the powder ejector stage to a first portion of the precursor powder, such that the heated first portion of powder may be injected below a second portion of the precursor powder to heat the second portion of precursor powder. Preferably, the residence time of the powder in any one of the stages is less than 30 seconds per stage so as to minimise sintering of the powder injected, such that desired nano-active material properties may be retained. Preferably, the high purity gas stream released from at least the externally heated calciner reactor stage and/or the post-processing reactor stage, rises upwards through the externally heated preheater stage and into the powder injector stage, such that heat form the high purity gas stream preheats the falling powder. Preferably, the external heat generated for the externally heated calciner may be generated in a furnace using flameless combustion systems, including regenerative burners. Preferably, the external heat for the externally heated calciner may be generated from electrical power elements preferably embedded in refractory materials. Preferably, the reactor stages are spaced apart and ay be adapted to expand and/or contract in use. Preferably, the stages are aggregated into an array, wherein the array may be closely packed and has a generally rectangular footprint. Preferably, the gas stream composition within the post-processing stage may be switched from that of the externally heated calciner stage to suppress the back reaction, so that the reaction may proceed further to completion by consuming heat stored in the particles, thereby lowering the external energy required to be supplied to the other sections.

Preferably, the precursor materials are compounds with volatile constituents which may be in the range of 30-60% of atomic volume, such that the volatile constituents can be extracted during calcination of the materials. Preferably, the volatility may arise from decomposition of carbonates, hydroxides, hydrates, ammonia ligands, nitrates and organic ligands generally. They may be minerals, natural products or synthetic materials, and mixtures thereof. Preferably, calcination of the precursor material may have at least one property elected from the group of; a porosity in the range of 0.3 to 0.6, a relatively high surface area relative to the material micron diameter, a crystalline structure, an amorphous structure, and a precursor particle size distribution in the range of 0.4 to 100 microns diameter. Preferably, a second powder material may be introduced in the post processing section of is a nano-active material produced in a separate process. Preferably, the degree of calcination of the product may be greater than 90% and the mean particle size of the hot powder product may be less than 10%, and the surface area of may be greater than 120 $m^2/g$. Preferably, at least one nano-active material may be selected form the group of, MgO, CaO, MgO.CaCO3, MgO.CaO, AgO, ZnO, CuO, FeO, $Fe_2O_3$, $Fe_3O_4$, $TiO_2$, $SiO_2$, $Al_2O_3$, MnO, $Mn_3O_4$, and other suitable metal oxides, including mixtures thereof, and may also include metal sulphates, metal phosphates and other non-volatile materials. Preferably, calcination of the precursor material may produce a local region in which the local porosity, surface area and the structure length scale in the region are such that the region of the particle may be a nano-active region by virtue of these properties. Preferably, the ground material comprises a mixture of two or more different powders, in which at least one of said powders may be a calcined nano-active material, the two or more different powders being injected into the post-processing reactor stage, where the input powders react to form a product by a reaction enhanced by using highly reactive nano-materials formed in the externally heated calciner reactor stage. Preferably, the reactor system may be adapted to produce cement clinker from a mixture of limestone, silica and clays, in which the calciner reactor may produce nano-active lime and nano-active meta-clay, and the processing in the post-processing reactor stage produces cement clinker with the inclusion of additional heat to raise the temperature to effect clinker reactions between nano-active materials. Preferably, magnesium metal may be produced from a mixture of dolomite and a reductant, such as ferrosilicon, in which the calciner reactor stage produces nano-active dolime, and the processing in the post-processing reactor stage produces magnesium metal vapour with the inclusion of additional heat to raise the temperature of the material to induce the reduction reaction.

Preferably, the method may produce battery materials from multivalent metal oxide, sulphate or phosphate materials, or mixtures of such materials, and with conducting ions such as lithium, sodium or magnesium such that these conducting ions are intercalated uniformly into the materials. Preferably, at least one of the materials may be calcined from a precursor to generate carbon in the pores of the material to also provide a pathway for electronic conduction through the material.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

BRIEF DESCRIPTION OF THE FIGURES

Embodiments of the invention will be better understood and readily apparent to one of ordinary skill in the art from the following written description, by way of example only, and in conjunction with the drawings, in which.

DESCRIPTION OF THE INVENTION

Figure 1:
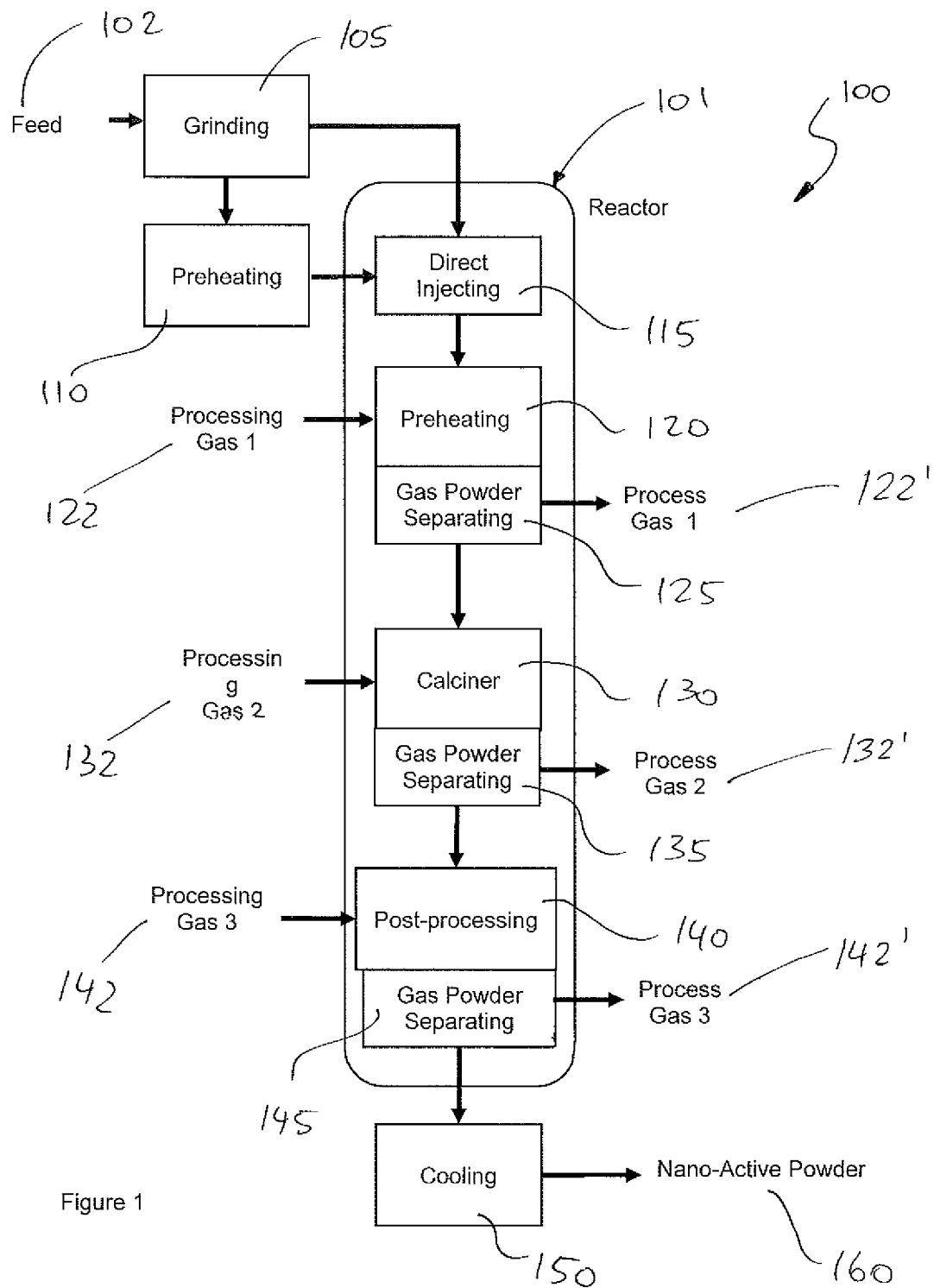
FIG. 1 illustrates a schematic of an embodiment of a system of the present disclosure of with multiple segments.

Preferred embodiments of the invention will now be described by reference to the accompanying drawings and non-limiting examples.

This invention may be directed towards a further development of the flash calcination process described by Sceats and Horley (WO2007045048) for minerals (incorporated herein by reference), and Sceats (WO2015/077818) for particular application to the production of Portland cement (incorporated herein by reference) and Sceats PCT/AU2015/000684 (incorporated herein by reference).

Preferably, the production of a nano-active materials occurs by indirect heating an entrained flow of precursor particles in a gas stream, in which the particles flow downwards under gravity. The length of the reactor is typically from 10 to 50 meters and the cross-section of the reactor is typically about 1 to 5 square meters to ensure that the particles flowing down through the reactor are uniformly heated by radiation and convection heat transfer from the reactor walls. The mass loading of the particles are such that the particles fall downwards through the reactor under gravity, and entrained with the gas under the friction forces of the downward gas flow. The diameter of the reactor is sufficient for the velocity of the gas to be around of 0.5 to 2 m/s, so that the residence time of the entrained particles in the reactor is the order of 10 to 50 seconds. This may allow the calcination reaction to proceed to near completion on that timescale, and the surface area of the reactor is sufficient to deliver the energy for calcination from the external furnace through the reactor walls. The desired reaction time is a balance of the required reaction time determined by reaction kinetics and heat transfer to produce the nano-active materials, with the kinetics of sintering in the gas atmosphere which destroys the desirable attributes of the calcined product. Further, it will be appreciated that the particle size of the precursor input into the reactor will dictate the desired residence time and/or velocity within the reactor to allow for a desired compound to be produced which exhibit desired nano-active properties, such as a desired porosity or reactivity.

The entrained flow leads to a narrow distribution of the degree of calcination, the porosity and surface area of the calcined particles. Also, the invention allows for control of the gas composition in the reactor compared to traditional calciner reactors where the particles are mixed with hot combustion gases, so that the particles may be prepared in a desired oxidation state, enabling novel nano-active materials to be produced for specific applications that require such control, such as battery electrode materials and catalysts, where the oxidation state of the product is critical to performance.

Preferably, the system of the present invention may improve the control of the gas compositions in the reactor. For example, the present system may allow for separation of corrosive gases generated at low temperatures so that they do not corrode the reactor wall materials, which is commonly steel, at high temperature and do not become constituents of the calcined gas stream sot that post-processing of the gas can be minimised. The system may also preferably be adapted to separate the oxidation and reduction of the calcined materials so that reactive sintering can be suppressed, where the general principle is that the nano-active properties are degraded if the calcined product reacts with the gas during the high temperature calcination stage. Control of the sintering kinetics, particularly for those materials that are subject to catalysis from gases such as steam and $CO_2$ may also be achieved by the system, particularly via temperature control and input and extraction of gases.

Further embodiments of the system may be improve the control of the temperature profile of the steel walls of the reactor, and the associated risks of corrosion, fouling and creep of the steel. The temperature profile will typically determine the energy transfer from the reactor to the powder and gas, and it is important to optimise the temperature profile to balance the calcination process kinetics that creates the nano-active material with the sintering kinetics which destroys the nano-activity. In this way the stress on the reactor may be minimised and therefore the reactor life may be maximised.

Some embodiments of the system may allow for reduced energy costs for processing a precursor to manufacture a product. For example, the need to use gases, such as steam, to inject the particles in the calciner may be eliminated or minimised, so that the energy for subsequently heating these gases in the reactor, or reactor segment, is removed. As another example, optimising the energy flows within the reactor, including the recuperation of energy of combustion gases (if used) and the recuperation of energy from the gas and solid exhaust streams into the powder may also improve operational costs. Further, quenching the calcined material may also reduce sintering of the product. It may be highly desirable that energy recuperation be achieved within the reactor so that the use of costly auxiliary heat exchangers may be reduced.

In yet another embodiment, the system may be an integrated reactor system with one or more of the features described above, in which the processing capacity of the plant can be increased in a way that delivers an economy of scale and improved process efficiencies. Further, the system may be scalable to process larger volumes of materials while maintaining an acceptable level of efficiency.

In some applications the processed material comprises a mixture of particles of different compounds that are processed together to activate one of more of the materials in the mixture, and which are then post-processed, generally at a higher temperature than the calciner, to form desired compounded materials. The nano-activity of the reactants are such that there is an enhanced reaction rate in this pyro-process. One advantage of this process may be the elimination of the need to form compressed briquettes of the mixed materials to promote interparticle contacts, as if often done in such pyro-processing applications. The enhanced reaction rate made lead to simpler, more energy efficient post-processing reactor.

The means of solving the problems is considered from the aspect of segmentation of the reactor processes. Most generally, the approach is to segment the reactor into a number of sections, in which each segment has a predetermined function, which provide the means for better control of the reactor processes. Segmentation of the reactor may allow for a number of improvements over known reactor systems.

The invention described herein relates to a process where a reactor is segmented into multiple stages, so that the temperature profile, gas composition and mass flows, in each stage can be controlled to yield additional desirable properties for the nano-active materials. Generally, the invention envisages a process flow in which the particles pass sequentially through the segments as they flow down the reactor under gravity. To clearly distinguish the reactor from prior art, there is no formation of a fluidised bed to generate a long residence time. However, the system of the present disclosure may allow for a "counterflow" of gases released from the powder input into the reactor, in which the gases rise against falling particles of the precursor partially processed precursor. Counterflow is used in the known art of Circulating Fluidised Bed (CFB) reactors in which a fraction of the particles in a fluidised bed are entrained in rising gases, such as combustion gases, that are injected into the base of the bed, and these particles are entrained in the gas and are separated and recirculated into the bed. However, the reactor concept is differentiated from the known CFB reactors by the fact that there are no gases injected into the gas of the reactor to form a "bed", nor is the residence time of these materials similar, as common CFB reactors require residence time of minutes to hours.

Preferably, at least one embodiment of the reactor system utilises a continuous flow, where it is not desirable to charge and discharge a bed of particles. In contrast, the reactor is preferably a segmented reactor, or a segmented Downer reactor in the sense that average powder flows downwards, and the gas may flow either downwards in co-flow with the particles, or upwards in counterflow with the particles.

For this invention, the stages of the reactor are referred herein for convenience to be in sequence from the top to the base of the reactor. The sequence may be, for example:—a. powder injector segment; b. externally heated preheater and/or calciner reactor segment; c. post-processing reactor segment; and d. powder ejector segment. It will be appreciated that other configurations may be used for other embodiments, and the sequence may have intermediary and/or additional stages or segments between one or more segments. Preferably, segment b. receives energy in the form of heat generated from endothermic reactions, in which heat is received through the reactor walls and/or the preheater walls. The post-processing segment may include the example of a multiple step calcination process, such a multiple step calcination process is described earlier by Sceats PCT/AU2015/000684, which is incorporated herein by reference. This sequence relates to the process and product benefits that arise by physically separating one or more of these processes into the segments, and optimising the design of each segment for an application. As such, each segment may carry out a portion of a process in a relatively more controlled environment to generate a more homogenous output material.

The performance of a reactor, such as a flash calciner reactor, may be improved with the process gas flowing in either co-flow or counterflow relative to the downwards flowing particles. This may be achieved by using dilute flow conditions. Without being constrained by theory, it is apparent that the counterflow conditions are achieved by the particles flowing through the reactor in an inhomogeneous flow, primarily in a particle flow which is concentrated near the walls of the reactor, where the gas velocity is low. The pressure drop, and thus energy dissipation, from the gas-particle friction is minimised by separating the particle flow in this way. In general terms, there is a small fraction of particles that are entrained in the rising gas near the centre of the tube and a larger down-flow of particles near the wall.

By keeping the gas superficial velocity at any height in the reactor or the order of 1 m/s or less, the fraction of powder captured in the gas up-flow can be kept below 10%, and preferably below 5%. This desirable condition can be met in conditions were the gas could lift 100% of the particles in a homogeneous particle flow. In another view, the low gas velocity and the solids flow means that the basic conditions for choking are met, so that such uniform flow will not eventuate. The high turbulence associated with the breakup of uniform flow not only reduces the capture of powder by the gas, but also leads to efficient heat transfer between the particles and the gas, and surprisingly, between the walls of the reactor and the gas/particle mixture. The increased circulation of the powder in counterflow compared to coflow means that the residence time of powder in such reactor segments is increased, and the desired conditions of calcination and sintering can be achieved by reducing the heat transfer rate from the reactor walls to compensate. Most generally, the desirable attributes of the reactor to produce nano-active materials can be maintained independently of whether the gas flow is coflow or counterflow with the average downwards flow of the particles.

The first aspect of the invention relates to the powder injector segment. The Sceats-Horley reactor considers conveying the solids from the base of a hopper in steam (to facilitate the kinetics of calcination) and then injecting that steam and particles into the reactor at high speed so that the particles are centrifuged against the wall and extract heat from the walls, which are heated externally by a rising heating gas in a furnace section. After the gas is exhausted from the reactor, the steam may then be condensed to generate of sufficiently pure $CO_2$ stream that meets the specifications for Carbon Capture and Storage (CCS) and preferably the specifications for food and medical grade $CO_2$. In this aspect, the powder is directly injected into the reactor, instead of entrainment in a gas. The powder may be pneumatically conveyed to the top of the reactor by air, or by a mechanical elevator, and held into a feed hopper. Any air in the powder may be removed by flushing the powder before injection. The injection into the calciner may be made, for example, using rotary valves or screw feeders, and is preferably in the form of a plume, or a number of plumes using injection tubes having a narrow diameter compared to the reactor tube diameter.

It has been determined that the plume spreads slowly by the drawing the calcination gas into the plume, and which expands the plume until the solids are reasonably uniformly spread across the reactor cross-section. In the case of the counterflow reactor configuration, the plume pushes the rising gas towards the walls. It has been observed that (a) the entrainment of solids in the rising gas is surprisingly low so that the injection system acts as a primary powder filter, which is beneficial; (b) the efficient gas-solids mixing provides a beneficial counter-current heat exchange between the hot rising gas with the incoming, ambient, solids. Thus the injector innovation for counterflow is an internal heat exchanger, which is beneficial for lowering energy consumption. The plume evolution is impacted by non-vertical gas flows as can occur from the gas exhaust geometry and the plume off-set and angle (if any). This sensitivity allows for optimisation of the injector section. With respect to heat exchange efficiency, the overall energy balance of the reactor recognises that there is heat in the solids powder exhausted from the base of the reactor, and in combustion gases from the external furnace (if combustion is used), and from other ancillary equipment. It is desirable that this energy is extracted and used to externally preheat the solids, using solid-solid heat exchangers and gas-solid heat exchanges. This recuperation is a known art. The most effective recuperation of heat, from an exergy perspective, is to split the flow of the ambient powder into two streams, and inject one stream into the plume at ambient temperature, as described above, whereby the powder in this stream is heated by the rising gas from the calciner segments below. The second stream is externally preheated from the aforesaid heat sources, and injected as a hot solids stream into the reactor at a point in the reactor where the temperature of the first injected stream is at the same temperature as the externally preheated second powder stream.

The plume evolution can be further controlled by the use of hanging chains or plates which control the flow of the rising gas into the plumes. That is, the devices that are used to form the plume may include chains of perforated steel pipes which facilitate the suction of hot gas into the falling particle stream. Through such means, the evolution of the solids plume in the reactor may be further optimised for heat transfer and particle entrainment.

The injection of the externally preheated stream may be done by using a splash plate to inject the powder through a pipe into the reactor through the walls. More preferably, the injection may be made through a thermally insulated inner concentric pipe that extends deeper into the reactor, and which maintains the symmetry of the reactor. The optimum mass ratio of the ambient solids and preheated solids can be deduced from the known art of heat exchangers. As a guide, the ratio is about the ratio of the mass flows of calcination gas and the product solids. For typical carbonate minerals, this ratio is approximately 1:2.

With the use of flameless combustion systems in the furnace, which recuperate significant heat from the combustion system, or the electrical heating systems described below, and the counterflow system described above to cool the calcination gas stream, the external preheating is primarily required to transfer heat from the solids product to the second solids stream described above. Solids-solids heat exchangers are a known art, and the methods include the use of heat transfer fluids, such as oils, inorganic molten salts and molten alkali metal heat pipes. Alternatively, a heat exchanger can use a pair of gas-solids heat exchangers to transfer the heat between the two solids streams. A particular embodiment is the case of the production of cement. In a typical cement plant, this is accomplished using a stack of suspension cyclones, and in modern plants up to six such stages are used. An alternative approach is to use a counterflow heat exchanger in which air is used as the heat transfer medium, with the air being heated in the clinker cooler circuit, and a plume injector preheated described above is used to externally preheat this second solids stream. The use of low air velocities provides the same benefits described for the solids injector system, namely a counterflow of rising hot air and a downflow of cold powder which exchange energy without a significant uptake of solids. This system, on the basis of exergy, has a more desirable efficient heat transfer efficiency than a suspension cyclone stack.

A further advantage of the counterflow mode of the first aspect is associated with the removal of corrosive gases and moisture that may be released during the preheating of the solids. Such gases are exhausted through the top of reactor, and do not penetrate deeper down the reactor where the higher temperatures of the reactor walls and the solids is such that they may otherwise corrode the steel or other materials. Examples of this would be the removal of water, carbon, sulphur, nitrogen and chlorides, often found in materials as impurities, and especially volatile organic impurities. It is noted that the temperature of the reactor walls can be cycled to impede or remove the deposition of condensable volatiles on the reactor walls in the region of the reactor. In that respect, it may be desirable to bleed a portion of the particles that are entrained in the cold gas, such that the surface area of these particles is larger than the reactor surface area on which deposition might otherwise occur. Such a stream of particles would scrub the gas of condensable materials. Most importantly, neither the hot volatile gases, nor the condensable solids, would be in contact with the heated reactor surfaces, so that corrosion is suppressed.

The second aspect of the invention relates to the externally heated preheater and calciner reactor segment. The temperature of the mixed solids streams described above may be below the reaction temperature of the materials, so that external heating is firstly required to heat the falling solids up to the temperature at which reaction commences. This may be the externally heated preheater segment. Below this, the heat from the externally heated calciner segment is used to convert the reactants to products. In case where the heat is provided by combustion, the desirable temperature distribution for both these segments can be provided by an array of burners. In the Sceats-Horley reactor, this was described as being provided by an array of natural gas combustors in which the hot gases are injected tangentially at high velocity into the external furnace region surrounding the steel reactor, so that the steel is protected from hot spots of the flame by recessing the combustors in the refractory. The gases rise through the furnace region and the temperature at any point along the reactor walls is dependent on the settings of the combustors below. The hot gases from the lower calciner region rise in the furnace annulus and the energy is used to externally preheat the falling solids, and the hot exhaust gases are also used to preheat the air for the combustors, and this hot air is distributed to the combustors. The improvement of this aspect of the design include:

(a) The use of flameless combustion burners. There are regenerative or recuperative designs in which the combustion is flameless because the preheated air raises the temperature of the air such that the combustion gas, typically natural gas or syngas, enters the furnace above the autoignition temperature. These furnaces are typically small, in the range of 100-500 kW, which allows for most, if not all of the combustion gas to be recirculated within the combustor to preheat its air. These systems have very high thermal efficiency and produce very low NOx and CO emissions. The homogeneous combustion reactions occur within the furnace, so that hot spots are eliminated and this minimises the local strains on the steel reactor tube. An array of such flameless burners allows the wall temperature profile to be more readily controlled than an array of conventional burners. The flameless burners described herein include regenerative burners.

(b) The use of electrical heating elements. Bare elements, including radiant tubes, operate at high temperatures, of the order of 1400° C., have a deleterious effect on the processing of powders for nano-active materials because the high temperature induces deleterious sintering. It is therefore preferable that radiant heat is transferred to the particles from a distributed surface area, such as that of a steel reactor tube described above, where the wall temperature is as low as possible. It has been found that the preferred approach is to bury the elements in a refractory plate, typically rectangular and to use an assembly of such plates to form the reactor "tube", so that the surface temperature of the assembled plates, when heated by electrical power is the order of 950-1050° C. or less, which is sufficiently low to limit sintering during calcination, yet provide radiant heat to the powder. In this embodiment, the reactor walls may be "refractory" materials with a high thermal conductivity, or steels, or coated steels.

It is noted that such a design allows for the construction of a segmented reactor from refractory plates, which can be extended from a square structure to an extended rectangular structure that can process powders injected from multiple plume injector systems described above. The replacement of a monolithic steel tube by an array of such plates reduces the thermal stresses on the reactor, which otherwise arise from the metal expansion and creep. Such a reactor design may have a very high thermal efficiency that offset the generally higher cost of electrical power than combustion gases. With renewable power, the nano-active materials produced from such a reactor may have a near zero emissions footprint.

Process temperatures for Calcination can be as high as about 950° C. and the temperatures from combustors (if used) can be variable, but typically is about 1200-1600° C. as controlled by the gas flows and materials. Ferritic steels have been developed for use in combustors and electrical elements and it is desirable that these steels are used to minimise the risk of the steel degradation. One approach to reducing the risk to the calciner segment is to segment the reactor steel so that stresses in the steel do not accumulate. For example, a design of the reactor may be from 20-35 meters high to accommodate the residence time for the reaction conditions. Such a structure can be fabricated as a single reactor, as a tube of that length, and about 1-3 m² cross-section. At high temperatures, such a tube must be self-supporting, and if that is done from the top, the thickness of steel at any height must be sufficient to support the hot steel below. Generally, the steel thickness may be tapered, from 1-6 mm at the base to over 14 mm at the top. These are costly steels to fabricate and weld. This problem may be solved by segmenting the steel into segments, preferably from 4-6 m in height, and supporting these segments on refractory stages. This approach allows lowers the accumulation of stress due to the long height, enables a relatively thin steel to be used in the construction of this segment, and reduces the sensitivity of the structure to pressure variations than cause a taller structure to crumple, and reduces the sensitivity of increase of the stresses due to accumulation of scale.

Another embodiment of the externally heated calciner is the case in which there are multiple calcination processes that occur, sequentially, at different temperatures. In such cases, this segment can be further segmented so that the reactions occur sequentially in different segments, and the calcination gases from each process may be separated using an intermediate solids hopper and gas bypass, which ensures that the hot gases from the segment below is not mixed with the gases from the lower temperature segments above. An example is the processing of dolomite which the $CO_2$ from magnesium carbonate ion pairs are released at about 780° C., and the $CO_2$ from the calcium carbonate ion pairs are released at about 900° C. Another example is the processing of biomass in which the volatile constituents are released as either volatile oils or Syngas at lower temperatures, and the char may be reacted, say, with injected hydrogen gas at higher temperatures. The sequence of the temperature of different processes, with different process gases, is a known art, the reactor described herein can be configured to control the sequence of the reactions. It is possible to isolate the segments so that the pressure is a variable in each segment, through the use of lock-hoppers, so that the reactions take place at different pressures and temperatures. An example of such a sequence is the case where the reactions in the segments are reverse reactions, such as the adsorption and regeneration of gases by a sorbent, as is the case for capture of $CO_2$ or oxygen by sorbent looping processes. For example, the reversible reaction of lime with $CO_2$ can be used to extract $CO_2$, and the reversible reaction of copper with oxygen can be used to extract oxygen. These processes are a known art, and the reactor design described herein allows for the reactions to take place continuously as the sorbent flows down the reactor through an endothermic sorption process stage and an exothermic desorption process stage.

Yet another embodiment of the invention may be directed towards a post-processing reactor segment.

In one embodiment, the system may provide for a means of rapid quenching of the particles after the Calciner Reactor segment. This is required where the objective is to produce a nano-active product with high surface area. Sintering is a process that generally is temperature controlled, and is only weakly dependent on heat transfer, and is often catalysed by steam and $CO_2$ for many metal oxide products. One embodiment is to use a segment in which the walls of the reactor are cooled, for example by fluid. However, a more preferred embodiment is to use a Post-processing Reactor segment described herein. Consider the particles in the base of the Calciner Reactor. The particles are at a temperature that near or is in excess of the equilibrium temperature of the calcination reaction at the partial pressure of the process gases in the Calciner reactor. As described above, there is usually no, or very little, non-process gases introduced into the Calciner reactor segment. If that reactor is designed to operate at 1 bar pressure, then the process gases will be at about 1 bar pressure through the reactor (neglecting pressure drops from friction). For example, in the calcination of limestone where $CO_2$ is the process gas, the product will be exhausted at a temperature in excess of about 900° C., being the equilibrium temperature for the production of lime from limestone at 1 bar of $CO_2$. A typical exhaust temperature of the solids is 930-980° C. because the particle may absorb heat faster than they can react. The method described herein to cool the gas stream to minimise sintering is (a) to ensure that the calcination reaction is only partially completed at the exhaust by control of the wall temperatures of the Calciner Reactor, and (b) to introduce a small amount of a neutral gas, such as air or steam, into the base of the Post-Processing Reactor into which the incompletely calcined particles are injected from the base of the Calciner reactor segment. Because of the particles entering the Post-processing reactor experience a switch of the gas pressure of the process gas to a lower partial pressure, the calcination process will recommence to drive the reaction towards completion, and the heat in the particles will be consumed by the reaction and the temperature of the particles will drop. The rate of the reaction and cooling will be attenuated by the build-up of the process gas in the Post-Processing Reactor, and this is controlled by the amount of neutral gas injected into the base of the reactor. Neglecting mixing by turbulence and the details of the kinetics, this Post-Processing Reactor ideally works as a counterflow reactor in which the rising gas stream accumulates the process gas as the particles fall through this gas stream and react and cool. The gas composition at the top of this reactor segment is a mixture of the neutral gas and the process gas. In one embodiment, this gas may be exhausted from the reactor separately from the calcination gas stream, and in another embodiment, it may be mixed with the calcination gas stream. The cooled solids are exhausted from the base of the reactor. The sintering processes are thermally activated, and the drop in the temperature, of say 150-200° C. is sufficient for the sintering to be quenched. Subsequent cooling of the product can occur by conventional means. The neutral gas selected for this process is one which preferably has no catalytic effect on sintering. For example, steam is known to have a strong impact in the sintering of lime and is not desirable if the objective is to maximise the nano-activity of the product. In such an example, air may be injected. Experience suggests that the neutral gas to residual calcination gas should be about 2-3 times, on a molar basis.

Another object for a Post Processing Reactor segment is in the production of materials for use in batteries or catalysts, in which the oxidation state of a metal ion is required to be controlled to give the desired performance. This object is achieved by adding a gas to this segment that may react with the product from the first stage to produce, or maintain the required oxidation state. For example, high oxidation states may be obtained by adding oxygen or air; intermediate oxidation states may be maintained by adding $CO_2$ or steam; and low oxidation states may be obtained by adding ammonia, methane or hydrogen. The choice of the gas is selected using the generally known thermodynamic equations for the given reactor temperature and pressure. In certain examples, the desired material may be a metal state. In other examples, the gas may contain organic molecules that are reduced to carbon inside the pores of the oxide product, for example, in the production of nano-active battery materials in which the pores can preferably provide an electron conduction pathway for fast charge and discharge. Most generally, the advantage of this process is to modify the production process of the nano-material following the initial step in the Calcination Reactor in which a nano-active precursor material is initially formed. That precursor is generally porous, with a high surface area, so that such second stage reaction processes can take place under controlled conditions of the gas composition, pressure and temperature. This single reactor processing significantly reduces the complexity and costs, and the sintering risk, of using multiple separate reactors. Without being bound by theory, such nano-active materials maintain their desirable mesoporous structure developed during the first calcination process, and the subsequent processes use that structure to produce, in situ, a chemically uniform material.

Another object for a post-processing segment is to produce new materials that are formed by solid-solid reactions of two nano-active materials. It has been found that the pyro-processing reactions between particles of different materials is enhanced if one or more of the particles is a nano-active material, and most preferably if all materials are nano-active materials. Without being bound by theory, it would seem that the fast reactions between particles is enhanced if the particles have high mesopore properties, presumably because the fastest processes are those in which the new materials are formed through the diffusion of ions on the surfaces, rather than the slower volume diffusion. The net result is that the product is quickly formed, and may exhibit a residual mesoporous structure.

One example embodiment is the manufacture of magnesium metal in the Pidgeon process in which nano-active dolime, formed from the flash calcination of dolomite, is reduced with a solid state reductant, such as ferrosilicon, to produce magnesium vapour, which is collected as magnesium metal. It is also preferable that the reductant is a nano-active material.

Another example embodiment is the manufacture of Portland cement from the reaction of nano-active lime with silica and clay. It is preferable that the silica and clay are also produced as nano-active materials. The post-processing segment in this example may be a rotary kiln, and in the context of low emission cement, the rotary kiln may be an electric kiln. The endothermic reactions that form the calcium silicate materials of cement occur at temperatures around 1200-1400° C., which is readily obtained by electrical elements. As previously described, the heat from cooling the clinker may be extracted by air, or fluid heat transfer, to preheat the raw meal, or preferably by physical mixing of clinker and the raw meal, and separating them on the basis of particle size.

Another example embodiment is the manufacture of battery materials in which a thermal process is used to intercalate, for example, the conducting ions such as lithium, sodium or magnesium into a nano-active multi-oxidation state of materials such as manganese, vanadium, iron, copper, and the like, and mixtures thereof, produced by the calcination of precursors such as carbonate, nitrate and ammonia salts, under controlled gas atmospheres, as previously described. It is also preferable that the lithium, sodium or magnesium ions are nano-active oxide materials produced, for example, by the flash calcination of hydroxide or carbonate precursors.

Further forms of the invention will be apparent from the description and drawings, and from the claims.

FIG. 1 is a schematic of an embodiment of the system of the present disclosure. The system 100 comprises a feed material input into a grinder 105. The grinder then grinds the feed material 102 to a desired size and to produce a ground feed 102' or "powder". The ground feed 102' may be referred to herein as a "precursor" 102'. The precursor 102' may be then input into a preheater 110 and/or a reactor 101. The preheater 110 may be a segment of the system although the preheater need not be internal the reactor 101, or may be any means to allow for preheating of a portion of the ground feed material 102'. After preheating ground material may be input into the reactor 101. Preferably, the reactor 101 comprises a plurality of reactor segments. As shown in FIG. 1, the first reactor segment may be an indirect heating segment 115 wherein the input feed material 102' is heated to a desired temperature. Preferably, the desired temperature is less than a calcination reaction temperature of the feed 102' input into the reactor 101. After heating the feed material 102' it is input into preheater 120 in which a first processing gas stream 122 is input into the preheater 120. The first processing gas stream may initiate a reaction for the feed material 102' or may assist with heating the internal temperature of the preheater 120. The feed is then fed into the gas powder separator 125 in which the input first gas is extracted from the ground feed or "powder". The used first gas is extracted as used first gas stream 122'. Preferably, the used first gas stream 122' is generally the same composition as the first gas stream 122, however may contain minor impurities and/or be of a relatively lower temperature. The powder is then proceeds to a calciner 130 (also referred to as calciner reactor 130) where the powder is calcined, at least partially. The calciner 130 may allow for a second gas stream 132 to be input into the calciner to assist with the calcination process. The at least partially calcined powder is then processed in a further gas powder separator 135 to remove the input second gas 132 as a used second gas stream 132'. The at least partially calcined powder then moves to a post-processing segment 140 and a third gas stream 142 is input into the post-processing segment 140. The powder is then further refined in the post-processing segment in which the third processing gas interacts with the post-processed powder. The post-processed powder and third gas 142 are then separated in gas powder separator 145. After the removal of the used third gas 142' the processed powder is then cooled 150. Cooling may be in ambient temperatures or may be a quenching process to rapidly alter the crystalline structure of the processed powder. After exiting the reactor, the processed powder may have one or more nano-active properties and/or nano-active properties may be imparted to the material after cooling the processed powder.

Having a segmented system may have the advantage that segments may be interchanged, deactivated or adjusted to allow for a desired product to be produced. It will be appreciated that the segments may be sealable, may be separated by hoppers that inhibit transfer of gases between segments, or temperatures. Optionally, the segments may have a predefined shape which can direct precursor materials input into the system.

At least one nano-active property may include; a relatively high specific surface area, a relatively small particle size which may allow for dispersement in a carrier fluid with significantly reduced particle sizes, or have a volume weighted mean equal to or less than 0.3 μm. Preferably, the nano-active material produced has the nano active property of having a surface area of 100 m$^2$/g, and more preferably, is greater than 120 m$^2$/g. It will be appreciated that a nano-active property may also include a nano-structure, or other nano scale property such as a high surface area.

Figure 2:
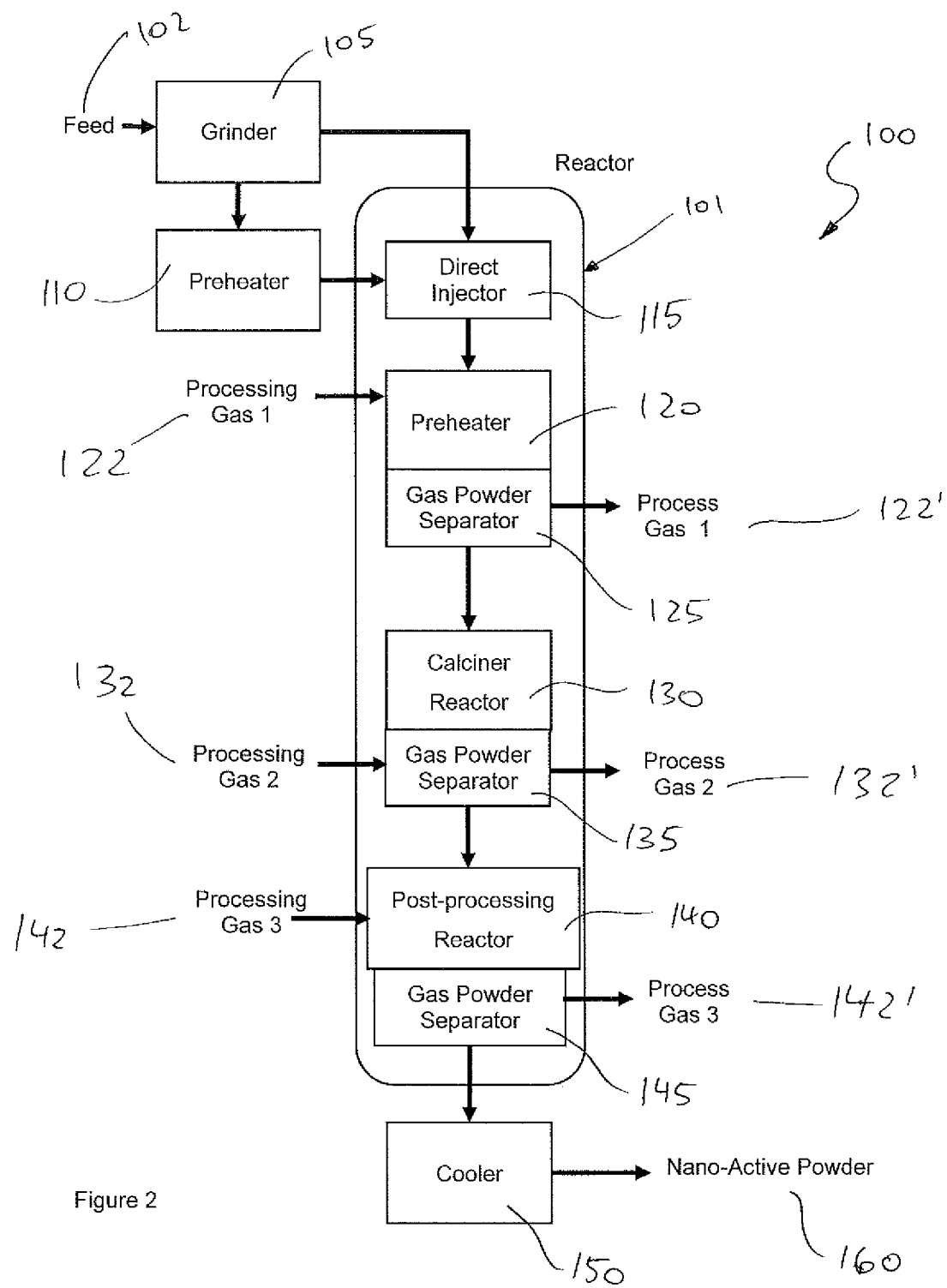
FIG. 2 illustrates another embodiment of the system of the present disclosure in which a processing gas is input into a gas powder separator segment.

Referring to FIG. 2, there is illustrated a further embodiment of the system 100. The system of FIG. 2 differs in that the second processing gas 132 is injected into the gas powder separator to pass over the calcined powder in the gas powder separator 135. In this way the gas being injected will be in contact with the powder after calcination, and for a relatively shorter time. It will be appreciated that the injected second gas stream 132 may be of a different temperature relative to the calcined powder. For example, the second gas stream may be of a lower temperature to partially quench or reduce the temperature of the calcined material to hinder further calcination and/or sintering of the material. Further, reducing the temperature may quench and impart a desired nano-crystalline structure or crystalline structure to the calcined powder. Alternatively, the gas may be of an elevated temperature such that a desired reaction takes place, preferably to remove residual volatile materials in the calcined powder.

Figure 3:
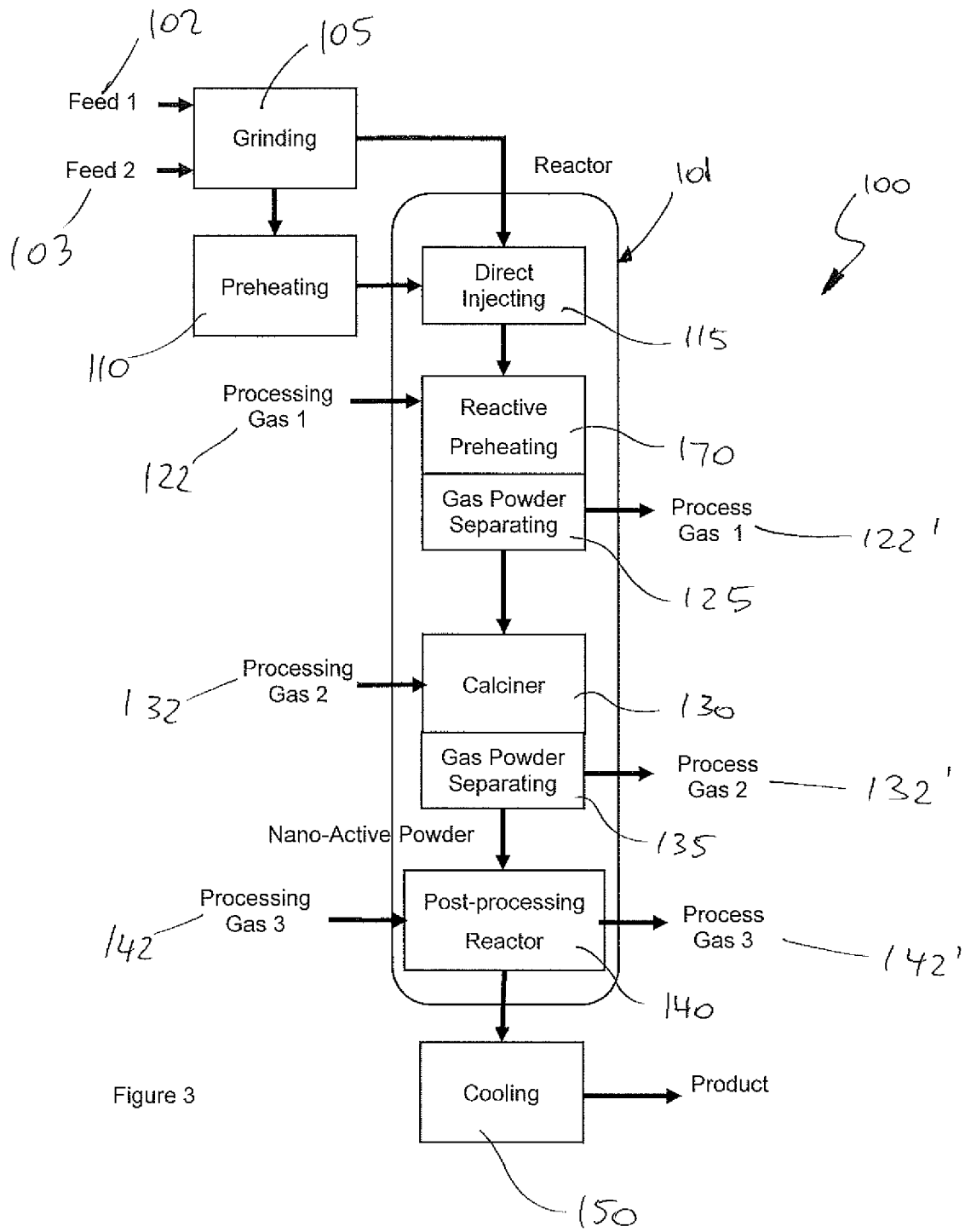
FIG. 3 illustrates a schematic of an embodiment of a system of the present disclosure of with multiple segments, in which one segment is a reactive preheater.

Referring to FIG. 3, there is illustrated yet another embodiment of the system 100 which is adapted to receive a precursor 102' made from a first feed material 102 and a second feed material 103. The first and second feed materials 102, 103 may be relatively inert when combined, but may react under a controlled pressure and/or temperature. The first and second feed materials 102, 103 may be ground and then fed into the reactor and/or the preheater. Optionally, each of the feed materials 102, 103 are ground separately, such that one feed material can be passed into the preheater and the other into the reactor without preheating. The ratios of the first feed material 102 and the second feed material 103 may be any desired ratio, depending on the desired powdered product to be manufactured.

The preheater segment 120 may be replaced by a reacting preheating segment 170, in which the precursor 102' undergoes a chemical reaction. The reaction may be instigated by pressure, temperature, the introduction of a gas or a catalyst. The reaction may bind particles from the ground first and second feeds which were used to form the precursor 102'. Optionally, the first gas stream may be injected into the reactive preheater and/or the gas powder separator.

After a precursor has been calcined, or partially calcined, and the second gas stream 132 is separated from the calcined powder (calcined precursor), a nano-active powder may be injected into the reactor 101. The nano active powder may be selected from the ground of, MgO, CaO, MgO.CaCO$_3$, MgO.CaO, AgO, ZnO, CuO, TiO$_2$, SiO$_2$, Al$_2$O$_3$, Mn$_3$O$_4$ and more generally any metal oxide. It will be appreciated that any other desired powder, catalyst or reactant may be injected into the reactor 101. The injection of the nano-active powder may cause a chemical reaction to occur between the calcined precursor material and the nano-active powder. The nano-active powder and the calcined precursor may be referred to herein as a mixed powder, regardless of whether the nano-active material and the calcined precursor undergo a chemical reaction. The mixed powder is then subject to a third gas stream 142 in a post-processing reactor 140. The used third gas stream 142' may also be extracted from the post-processing reactor 140 before the processed mixed powder is ejected from the reactor 101 and cooled 150. Again, cooling may be a further processing step, or the product may be allow to cool in ambient temperatures. After cooling the product may be transported, and/or bagged. It will be appreciated that the post-processing reactor 145 may be replaced with a pyro-processing segment (not shown).

Figure 4:
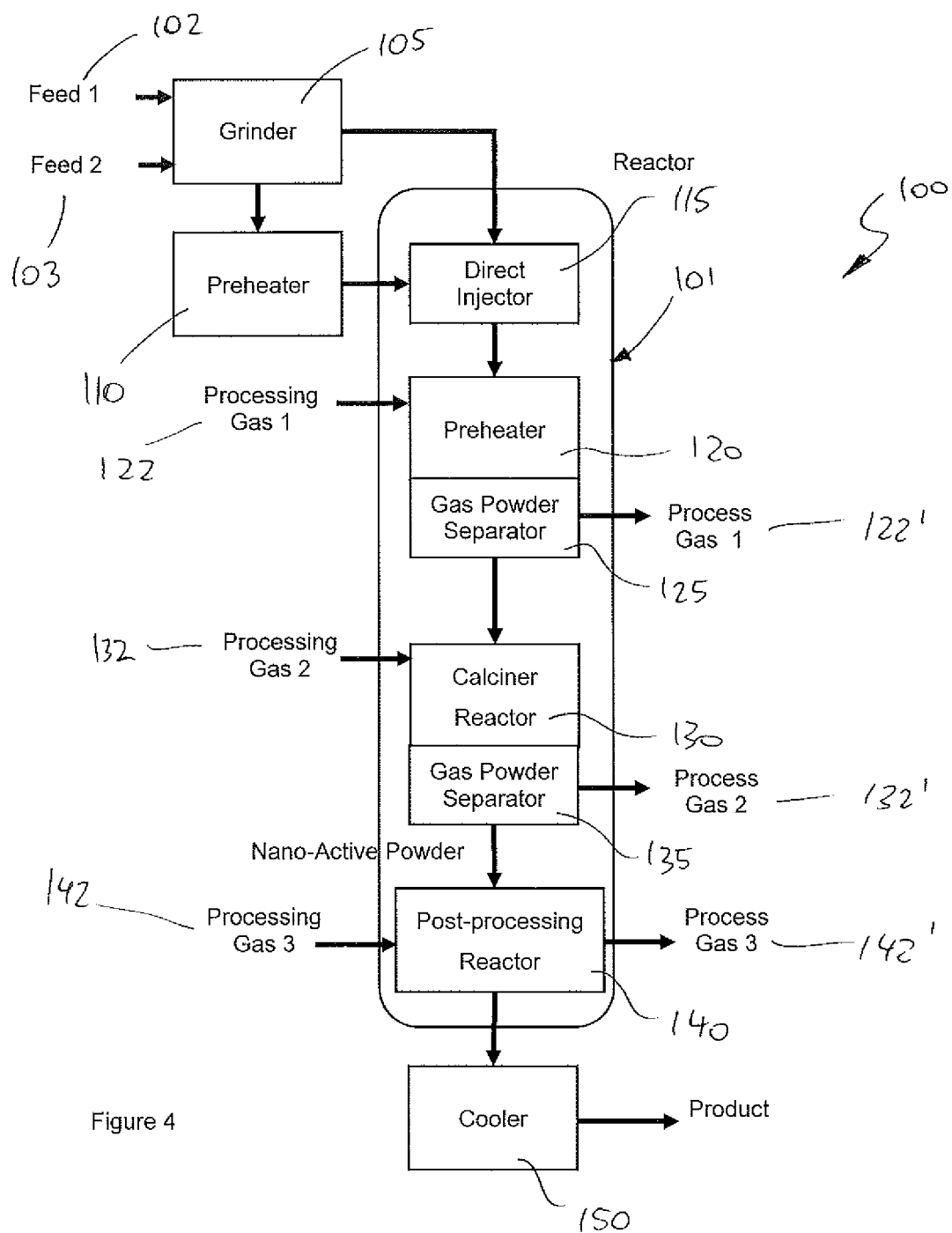
FIG. 4 illustrates a schematic of an embodiment of a system of the present disclosure of with multiple segments, in which one segment is a preheater.

Turning now to FIG. 4, there is shown another embodiment of the system 100. Similar to FIG. 3, the system may accept at least a multiple feed material precursor. However, in this embodiment the reactive preheating segment is a preheater segment 120 similar to the embodiments illustrated in FIGS. 1 and 2.

While FIGS. 3 and 4 illustrate only two feed materials, any number of feed materials may be used to form the precursor material. Further, the feed materials may be ground to different micron sizes to react differently within the reactor.

The processing steps of the embodiment of FIG. 1 are based on the premise that the nano-active material will be produced from a single feed material.

Examples of compounds and materials which may be nano-active materials, or may be imparted with nano-active properties, are; MgO, CaO, MgO.CaCO$_3$, MgO.CaO, AgO, ZnO, CuO, TiO$_2$, SiO$_2$, Al$_2$O$_3$, Mn$_3$O$_4$ and more generally any metal oxide. All of the aforementioned compounds and/or materials may be suitable for processing by the system. The feed materials 102 for such products are metal hydrates, hydroxides, carbonates, amines, nitrates, acetates, oxalates and more generally any such precursor that decomposes when heated up to the range of 900° C. to 1300° C., but more preferably about 1000° C. The decomposition may be accelerated by reaction, for example with air (highly oxygenated gas) or other input processing gas to produce oxidised gases such as CO$_2$, H$_2$O and NO$_2$. To make nano-active materials the precursors are chosen such that the molecular volume of the constituents atoms that are removed by calcination are a relatively large fraction of the molecular volume of the precursor. Thus the removal of these atoms by the calcination reaction, without collapse of the structure formed by the remaining (non-volatile) atoms, leads to a material that has a high porosity. Preferably, the high porosity is in the range of 0.4 to 0.6. A high surface area per weight may be in the range of 60 m$^2$/g to 150 m$^2$/g, but more preferably is in the range of 100 m$^2$/g to 125 m$^2$/g. Producing a high porosity product can be used for rapid chemical reactions as the relatively larger surface area of the compound/mineral/product can allow for accelerated reaction times.

The formation of a high surface area of the product relies on minimising the time where diffusion of these non-volatile atoms is limited. Preferably, the porosity is in the range of 0.4-0.6. Above the amount, the material is liable to fragment during calcination because the residual atoms cannot reconfigure sufficiently quickly to produce a strong bound nano-active structure. This is not necessarily an impediment, and the product handling systems may have to be used to handle large volumes of powder with particle sizes less than about 1 micron. Generally, a relatively small amount of such decrepitation is observed. The residence time of the powder in the calciner reactor must be long enough to allow the material to form a bound structure, but short enough that the diffusion of atoms does not lead to a closure of the small pores, on the nanometer scale, which would remove the material nanostructures that are responsible for the nano-activity. Preferably, said residence time is less than 50 seconds. The process and the reactor described below establish the necessary conditions for the production of nano-active materials.

While oxides are generic examples, the control of the atmosphere allows the formation of compound nano-active materials. In one embodiment, the system allows processing of precursor materials which contain organic compounds, with low oxygen content, in inert gases can lead to the production of composite metal oxide-carbon nano-active materials as an example. In another embodiment, the precursors are formed by slurrying together nano-active materials and other compounds, separating the reacted powder, and re-calcining the product to a new nano-active material. An example is the formation of alkali activated MgO based sorbents for $CO_2$ capture. In another embodiment application, nano-active amorphous silica can be prepared from rice hulls, or corn leaves or other agricultural by-products by processing in air, steam, or oxygen or mixtures where the organic components are removed by gasification and flameless combustion processes. In this example, the preheater reactor may remove volatiles and the calciner reactor may remove the residual carbon by oxidation/gasification.

In addition, there are applications where it is important to produce regions of nano-activity in the particle. Examples may include minerals in which there are chemical species that are not accessible to reaction from a solution. Examples may include minerals such as clays, crandallite and glauconite. In such examples, it has been found that the calcination process enabled by the reactor described herein removes volatile species from water of crystallisation and hydroxides in the mineral matrix, creating local nano-structures and nano-pores. For crandallite and glauconite, these nano-regions enable access to the desired P and K fertilizers respectively by weak acids in soils. The mineral remains relatively inert, and is not greatly impacted by the calcination process, such that the overall porosity change of the mineral is small, but the nano-scale pores in the nano-active regions of the mineral provide local nano-activity near the nutrients.

The system of FIG. 1, and the reactor system of FIG. 2, may be used with the following process and associated systems. Step 1; grinding of the precursor to produce powders having sizes in the range of 1-100 microns. Step 2; optionally, splitting the feed into a number of streams with different proportions. Step 3; preheating the powder streams by conventional means, such as heating from the waste heat in products produced by the system and/or combustion gases. Preferably, the proportions of powder to be heated is matched to the mass flows and thermal energy of the product heat and/or combustion gases to extract desired heat. Step 4; direct injection of the powder streams into the reactive preheater. Optionally, direct injection is at different points of the reactive preheater such that the heat to be transferred into the reactor is as efficient as possible. For example, heat may be injected transverse to the flow of particles or may be injected in a generally similar direction to the flow of particles in the reactor. Step 5; flash reactive preheating of the powder, optionally with an injected gas stream, in the reactive preheater segment. Preferably, the temperature is raised to remove impurities by either volatilisation and/or cause a reaction with the injected gas, however the temperature is maintained generally below a calcination temperature, such that the primary reaction process can take place in the short residence time of the flash calciner segment. Preferably the residence time is 30 seconds or less, and is more preferably less than 15 seconds. The heat for the preheating and reaction may be transferred through walls of the segment, and the gas in the reactor is produced from calcination reactions, and the residence time in the reactor is typically less than 5 to 10 seconds so that the impurity reactions have sufficient time to occur, but insufficient time for the calcination reaction to proceed to any significant extent, such as below 5% calcination by weight, or 5% by surface area, or 5% by volume. Step 6; separation of the powder and the process gases to enable injection of powder into the calciner reactor segment to ensure that the impurity laden process gases are not significantly injected into the calciner reactor. Such a separation may be achieved by counterflowing the gas upwards against the falling solids. Step 7; calcination of the powder in the calciner reactor segment, wherein the heat for the reaction may be transferred through walls of the segment, and to the gas in the reactor which is produced from calcination. Optionally, the residence time in the reactor is typically less than 50 seconds so that the powder particles have sufficient time to be produced, while of an insufficient time for the nano-structures to be depleted or destroyed by sintering. Preferably, the metal surfaces of the combustor or electrical heater (for the preheater) are protected from scale build up by sacrificial metal plates if the materials have a propensity to form scale. The heating elements are configured so that a desirable wall temperature distribution can be achieved to produce the required degree of calcination and the required nano-activity. In certain examples, a process gas may be introduced into the Calciner Reactor segment. Step 8; separation of unsintered nano-active materials from the pure or relatively pure process gas stream in a fast separation process whereby that inhibits the sintering process. Such a separation may be achieved by counterflowing the gas upwards against the falling solids. Step 9; reactive flash partial cooling of the unsintered powder in the post-processing reactor segment. Optionally, heat from the powder is consumed by the completion of the calcination reaction, which is enabled by the change of the partial pressure of the calcination process gas through the injection of a neutral processing gas, so that the temperature falls to a level at which sintering is supressed. Step 10; separation of the partially cooled nano-active materials from the mixture of the process gas and the neutral gas using conventional powder separation systems. Step 11; optionally, conventional cooling of the nano-active powder to near ambient conditions for bagging as a product, including the preheating steps described above.

In yet another embodiment, feed powder is input into the system and allowed to fall through at least one reactor segment via gravity and the gas friction, in a downward vertical flow through the reactive elements or compositions. The residence time in segments is controlled such that the reactions and sintering of the materials input into the system an uncontaminated nano-active materials. Injecting a powder stream into at least one segment preferably uses direct injection so that the injection of external gases, such as external gases from pneumatic transport, is minimised or eliminated. Preheating of the injected powder streams may extract energy (heat) from at least one of, the combustion gases, the process gases, and the hot solids product streams (powder streams) using conventional processes so that the thermal efficiency of the overall process is optimised. This may include the use of counterflowing the downflowing solids with rising gas streams. Gases may be injectable into various segments of the reactor as required to promote a respective reaction in a respective segment. The gases may then be ejected from those segments with any process gas, so that there is minimal contamination by these gases in the segment positioned relatively below the segment which is receiving the injectable gas.

The heating of the powders in the reactive segments may be carried out by externally heating a reactor segment wall to ensure that the combustion gas does not react with the powders or add impurities to the process gas streams. The preferable means of heating is through the use of an array of flameless combustion systems and/or electrical heating elements that provide radiant heat through metal or ceramic walls. In this way the process for manufacturing a product with the reactor segments can be separate from the combustion gas, if a combustion gas is used. These heating systems have a high thermal efficiency which can reduce the overall operational costs of the segments of the system. The surfaces of these radiative elements may be protected from the build-up of scale by the use of coatings, or non-structural thin steel elements, that resist the build-up of scale, and can be readily cleaned, replaced or vibrated in-situ. Optionally, when the gas and process streams are separated the build-up at a powder bed at the base of the separator is minimised such that that powders are not sintered beyond a desired degree. Separation systems may include at least one of; a counterflow and cyclone to maintain the in-line powder flow.

The systems of FIG. 3 and FIG. 4 are generally similar to the systems of FIGS. 1 and 2, however the systems of FIGS. 3 and 4 may allow for the consumption of one or more of the nano-active materials in a high temperature pyro-processing segment (not shown). Optionally, the post-processing reactor may be exchanged with a pyro-processing segment. The consumption of the one or more nano-active materials may occur in a reaction between two or more different particle materials in the ground feed, and by an optional introduction of a processing gas stream. FIG. 3 shows two such materials, but as many materials may be mixed as required for the production process. Optionally, the pyro-processing segment may be positioned near the top of the reactor such that feed materials are reacted before being calcined in the calcining segment.

The system of FIG. 3 and/or FIG. 4 may allow for the manufacture of Portland cement. For example, nano-active lime from the calciner segment may react with silicates and aluminates in a high temperature reactor, in the range of around 1000° C. to 1500° C., but more preferably at about 1,400° C. The high temperature reactor may be a post-processing reactor or a pyro-processing reactor segment. The nano-active lime reacts faster than conventional lime, so that the size and cost of this reactor segment can be reduced. A further advantage is the use of a reactive preheater is that sulphur, carbon, moisture and nitrogen compounds in the raw cement meal are decomposed by the introduction of a small air stream in the reactor, and removed from the reactor, so that the $CO_2$ gas produced in the calciner reactor segment is very pure. This is important so that the cost of $CO_2$ capture in the production of cement, to reduce greenhouse gas emissions, can be reduced by the reduction of the gas clean-up processes required to produce $CO_2$ that can meet sequestration requirements.

The system may also be suitable for the production of magnesium metal from the reduction of MgO using a reductant such as ferrosilicon. In the Pidgeon process (common process to produce magnesium metal), the MgO is produced by the calcination of dolomite $MgCO_3.CaCO_3$ rocks to produce dolime MgO+CaO, and this material is cooled and ground and mixed with ground ferrosilicon to form briquettes that are then pyro-processed in a furnace at temperatures in excess of about 1200° C. to give magnesium metal vapour and a calcium silicate slag.

In this embodiment, the dolomite and ferrosilicon a ground together, and processed as described in a two stage process using a preheater segment to remove impurities and a calciner segment to produce dolime as MgO.CaO and a pure gas stream of $CO_2$. The production of a clean stream of $CO_2$ is also a benefit for sequestration, and may lower the carbon footprint sufficiently that the lightweight magnesium metal can be used in alloys for vehicles. An additional benefit is that the calcination process occurs sufficiently rapidly that the MgO and CaO have not begun to phase separate into MgO and CaO materials, which occurs as a reactive sintering process because MgO.CaO is thermodynamically unstable. A further additional benefit is that the reactive post-processing stage allows the production of dolime with very little residual carbonate. Any residual carbonate that enters the post-processing segment leads to the re-oxidation of the magnesium metal by the reduction of the $CO_2$ released to form CO. Further, the high surface area of the dolime promotes the reaction between the unsintered dolime and the reductant to form the Mg vapour, such that the step of forming briquettes of dolime and the reductant is not required, compared to the conventional Pidgeon process. The benefit is a shorter pryro-processing time, and the potential to transform the production process from a batch to a continuous process.

Another example is the production of battery materials in which a nano-active materials, preferably of mixed oxides selected to give durability over multiple charge and discharge cycles where the nano-activity creates the desired mesoporous structures to facilitate fast ion and electrical transport in the product. In such cases, the use of calcination post-processing can be used to pre-intercalate the conducting ions such as lithium, magnesium and sodium into the material preferably by the reaction of nano-active ion materials, such as nano-active oxides produced by calcination of carbonates or hydroxides of the materials, with the multivalent oxides produced in this process; and also to produce electron conducting pathways in nano-active chars produced by re-calcining materials in which mesoporous precursors have been doped by organic materials that partly gasify to produce conductive char pathways through the calcined materials. Thus, using a combination of process described herein, a battery material can be produced with fast charge and discharge pathways for both ions and electrons.

The reactors described above may be scaled in throughput by the use of arrays reactor segments, or "modules" which are a system of reactor segments. These modules may share various elements described above, and the shape of the segment elements should be selected such that the module is compact and easy to construct and easy to extend capacity. Preferably, such modules should be constructed in a square or rectangular array. The segment elements may be tubes, or preferably welded plates in a square or rectangular configuration to facilitate said expansion.

The systems for generating the products as shown in FIGS. 1 and 4 may be configured for thermal energy recuperation or capture using heat exchangers. The heat exchangers may be used to pass thermal energy to preheat the materials and therefore reducing the amount of energy from indirect heat required to reach a desired temperature. a heat exchanger is not illustrated from FIGS. 1 to 4.

While particular embodiments and applications have been described, it will be evident to those skilled in the art that the present invention may be embodied in other specific forms and applications without departing from the essential characteristics thereof. The present embodiments and examples are therefore to be considered in all respects as illustrative and not restrictive, with all changes which come within the meaning and range of equivalency therefore intended to be embraced therein. It will further be understood that any reference herein to known prior art does not, unless the contrary indication appears, constitute an admission that such prior art is commonly known by those skilled in the art to which the invention relates.

Recent results have established that there are advantages of using flash calcination processes to make such nano-active materials, compared to the low temperature synthesis processes that make nanoparticles of the same material with equivalent surface area. This relates to the crystallite morphologies that form the product. Flash calcination with rapid quenching leaves exposed the very high energy crystalline surfaces which are often the source of the defect states that are the origin of the desirable nano-activity. While the small crystallites of the nanomaterials will also contain high-energy surfaces simply based on dimensional analysis, by contrast, the fast-quenched nano-active materials can contain the very highest energy surfaces, and in some cases, the structures are best described as amorphous materials. For example, the surface of rapidly quenched metal oxides may contain stable peroxides on the high energy surfaces, originating from oxygen defects in the nanomaterial skeleton resulting from the flash calcination and flash quenching of the nano-crystals formed. There may be a higher surface concentration of such defects than the equivalent nanoparticles formed at low temperatures because the activation energy to produce these defects inhibits their formation at low temperatures. Calcination of nanoparticles may fuse the nanoparticles, but may not create the desired defects, and generally heating induces sintering which removes such defects. The results suggest that the desired properties are created in the high temperature formation of the nanostructures.

That is, the properties of a nanomaterial are not only determined by the nanometer physical scale of the materials, but also are also differentiated in their activity by the means by which the materials are produced.

In yet another embodiment, the product generated may have the reciprocal of the surface area in $m^2/m^3$ should be in the order of nanometers to achieve such nano-active properties. The typical specific surface areas for such nanoactive materials are preferably in the range of 200-300 $m^2/g$, and more preferably in the range of 300-500 $m^2/g$.

In yet another embodiment, the precursor materials contain volatile constituents, including most organic materials, carbonates, hydroxides and the like. The precursor materials for the production of nano-active materials should comprise such volatile constituents, so that the residual non-volatile constituents such as metal oxides that remain can re-arrange during the calcination process to make the desired porous nano-active materials. The precursor materials may be minerals, or synthesised materials. The precursor should be in the form of particles with a size distribution of the order of microns, typically less than 100 microns, and preferably 1 to 10 microns, with a size distribution that is preferably compatible with the end use of the materials. Large impermeable particles may calcine incompletely, leaving unreacted cores, so that the cut-off for the particle size to make nano-active products depends on the precursor properties and the application. The calcination process should remove the volatile constituents to leave a product containing the non-volatile constituents with a particle size distribution that is preferably unchanged from the precursor size distribution, and thus a porosity that is close that of the relative volume of the volatile constituents. The calcination may take place in gaseous environment that is oxidising, reducing or neutral so that the products produced may be in preferred oxidation state.

This process flash calcines a precursor powdered material which has liberates a large volume of volatile species, such a steam, $CO_2$, ammonia, or organic compounds when heated. At high temperatures, the calcination process must be fast in order to suppress sintering within a particle, and bonding between particles. An alternative route, namely vacuum calcination at low temperature, is generally not scalable to industrial production.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The claims defining the invention are as follows:

1. A reactor system for producing a nano-active powder material that comprises a powder having nano-active powder material that comprises a powder having nano-activity due to nanostructures, the reactor system comprising:
   a) a powder injector configured to inject ground input precursor powder into the reactor system;
   b) an externally heated preheater configured to heat the precursor powder to a temperature to enable a calcination reaction of the precursor powder;
   c) an externally heated calciner reactor configured to rapidly remove primary precursor volatile constituents by the calcination reaction as a high purity gas stream to produce a nano-active product;
   d) a post-processing reactor configured to change the composition of the gas stream to produce a hot powder product base on the nano-activity of the nano-active product produced by the calciner reactor;
   e) a powder ejector configured to eject the hot powder product from the calciner reactor; and
   f) a heat exchanger configured to transfer heat from the hot powder product from the powder ejector to a first portion of the precursor powder, such that the heated first portion of powder is injected below a second portion of the precursor powder to heat the second portion of precursor powder;
   wherein input precursor powder flow downwards under gravity progressively through the reactor system.

2. The reactor system of claim 1, wherein the residence time of the powder in any one of the group of: the powder injector, the externally heated preheater, the externally heated calciner reactor, the post-processing reactor, and the powder ejector; is less than 30 seconds per stage so as to minimize sintering of the powder injected.

3. The reactor system of claim 1, wherein the high purity gas stream released from at least the externally heated calciner reactor and/or the post-processing reactor, rises upwards through the externally heated preheater and into the powder injector, such that heat from the high purity gas stream preheats the input precursor powder as it flows downwards.

4. The reactor system of claim 1, wherein the external heat for the externally heated calciner is generated in a furnace with flameless combustion including regenerative burners.

5. The reactor system of claim 1, wherein the external heat for the externally heated calciner is generated from electrical power elements embedded in refractory materials.

6. The reactor system of claim 1, wherein the reactors are spaced apart and are adapted to expand and contract, when in use.

7. The reactor system of claim 1, wherein the reactors are aggregated into an array, and wherein the reactors of the array are closely packed and the array has a rectangular shape.

8. The reactor system of claim 1, wherein the input precursor powder is compounds with volatile constituents in the range of 30-60% of atomic volume, such that the volatile constituents can be extracted during calcination of the precursor powder.

9. The reactor system of claim 1, wherein calcination of the input precursor powder induces at least one property in the calcined powder selected from the group of: a porosity in the range of 0.3 to 0.6, a relatively high surface area relative to the input precursor powder micron diameter, a crystalline structure, an amorphous structure, and a precursor particle size distribution in the range of 0.4 to 100 microns diameter.

10. The reactor system of claim 1, wherein a second powder material is introduced in the post processing reactor.

11. The reactor system of claim 1, wherein the degree of calcination is greater than 90% and the surface area is greater than 120 m2/g.

12. The reactor system of claim 1, wherein the nano-active materials are selected from the group of; MgO, CaO, $MgO.CaCO_3$, MgO.CaO, AgO, ZnO, CuO, FeO, $Fe_2O_3$, $Fe_3O_4$, $TiO_2$, $SiO_2$, $Al_2O_3$, MnO, $Mn_3O_4$, mixed metal sulphates, mixed metal hydrates, hydroxides, carbonates, nitrates, acetates, and oxalates.

13. The reactor system of claim 1, wherein the calcination of the input precursor powder produces a local region in which the local porosity, the surface area and the structure length scale in the region are such that the region of the particle is a nano-active region by virtue of these properties.

14. The reactor system of claim 1, wherein the ground input precursor powder comprises a mixture of two or more different powders, in which at least one of said powders is a calcined nano-active material, the two or more different powders being injected into the post-processing reactor, where the input powders react to form a product by a reaction enhanced by using highly reactive nano-materials formed in the externally heated calciner reactor.

15. The reactor system of claim 14, wherein the reactor system is adapted to produce cement clinker from a mixture of limestone, silica and clays, in which the calciner reactor produces nano-active lime and nano-active meta-clay, and the processing in the post-processing reactor stage produces cement clinker with the inclusion of additional heat to raise the temperature to effect clinker reactions between nano-active materials.

16. The reactor system of claim 14, wherein magnesium metal is produced from a mixture of dolomite and a reductant, including ferrosilicon, in which the externally heated calciner reactor produces nano-active dolime, and the processing in the post-processing reactor produces magnesium metal vapour with the inclusion of additional heat to raise the temperature of the dolomite and the reductant to induce a reduction reaction.

17. The reactor system of claim 13, wherein the system produces battery materials from multivalent metal oxide, sulphate or phosphate materials, or mixtures of such materials, and with conducting ions including lithium, sodium or magnesium such that these conducting ions are intercalated uniformly into the battery materials.

18. The reactor system of claim 13, wherein at least one of the calcined input precursor powder has been calcined from a precursor to generate carbon in the pores of the calcined precursor powder to also provide a pathway for electronic conduction through the calcined precursor powder.

* * * * *